United States Patent [19]

Roman

[11] 4,302,236
[45] Nov. 24, 1981

[54] COMPOSTING SYSTEM USED IN SCRUBBING GAS EFFLUVIA

[75] Inventor: Walter C. Roman, Worthington, Ohio

[73] Assignee: Ultimate Resources, Inc., Westerville, Ohio

[21] Appl. No.: 122,882

[22] Filed: Feb. 20, 1980

[51] Int. Cl.³ .............................................. C05F 9/04
[52] U.S. Cl. ........................................... 71/9; 55/73; 55/98; 71/13; 210/609; 210/613
[58] Field of Search ....................... 55/73, 74, 98, 267, 55/387, 474; 71/9, 11–14, 24, 25; 210/601, 609, 613, 620, 170; 435/262, 313, 316; 422/173, 176, 184, 187

[56] References Cited

U.S. PATENT DOCUMENTS

| | | | |
|---|---|---|---|
| 2,798,800 | 7/1957 | Geraghty et al. | 71/9 |
| 3,579,320 | 5/1971 | Pesses | 71/12 |
| 3,733,033 | 5/1973 | Cobey | 241/101.7 |
| 3,828,525 | 8/1974 | Copa et al. | 55/74 |
| 3,855,121 | 12/1974 | Gough | 55/73 |
| 4,161,426 | 7/1979 | Kneer | 55/74 |
| 4,201,663 | 5/1980 | Rollag et al. | 55/73 |
| 4,225,381 | 9/1980 | Ishikawa et al. | 55/73 |
| 4,230,676 | 10/1980 | Taylor et al. | 435/289 |

FOREIGN PATENT DOCUMENTS 407843  4/1974  U.S.S.R. .............................. 210/618

OTHER PUBLICATIONS

Hicks, "Odor Control in Waste-Water Treatment Systems Proc.", *Second Intl. Clean Air Cong.*, Acad. Press N.Y., pp. 867–876, 1971.
Miyamoto et al., "Land Disposal of Waste Gases: I Flow Analysis of Gas Injection Systems", *J. Environ. Qual.*, vol. 3, No. 1, pp. 49–55, 1974.
Warrick et al., "Land Disposal of Waste Gases: II Gas Flow from Buried Pipes", *J. Envir. Qual.*, vol. 3, No. 1, pp. 55–60, 1974.
Bohn et al., "Soil as a Sorbent and Filter of Waste Gases", *Sym. on Land for Waste Management*, Nat. Res. Council, Ottawa, Canada, pp. 104–114, 1973.
Chemical Abstracts 69:12755n, 1968.
Bohn, "Soil & Compost Filters of Malodorant Gases", *APCAJ*, vol. 25, No. 9, Sep. 1975, pp. 953–955.
Bohn, "Compost Scrubbers of Malodorous Air Streams", *Compost Science*, Winter 1976, pp. 15–17.
"Soil Absorption of Air Pollutants", *J. of Envir. Qual.*, vol. 1, No. 4, pp. 372–377, 1972.
"Soil Treatment of Organic Waste Gases", *Soils for Management of Organic Wastes & Waste Waters*, pp. 607–617, 1977.

*Primary Examiner*—Peter A. Hruskoci
*Attorney, Agent, or Firm*—Mueller and Smith

[57] ABSTRACT

Disclosed is a method for removing inorganic acid-forming constituents from a gas stream contaminated therewith (e.g. high sulfur coal effluent). Such removal is accomplished by passing the gas stream through an active composting biodegradable organic waste held under thermophilic bacteria-phase digestion conditions. Also disclosed is a comprehensive composting treatment site which desirably employs a windrowing composting technique and is suitably adapted to be operated with the gas stream scrubbing process disclosed herein.

11 Claims, 4 Drawing Figures

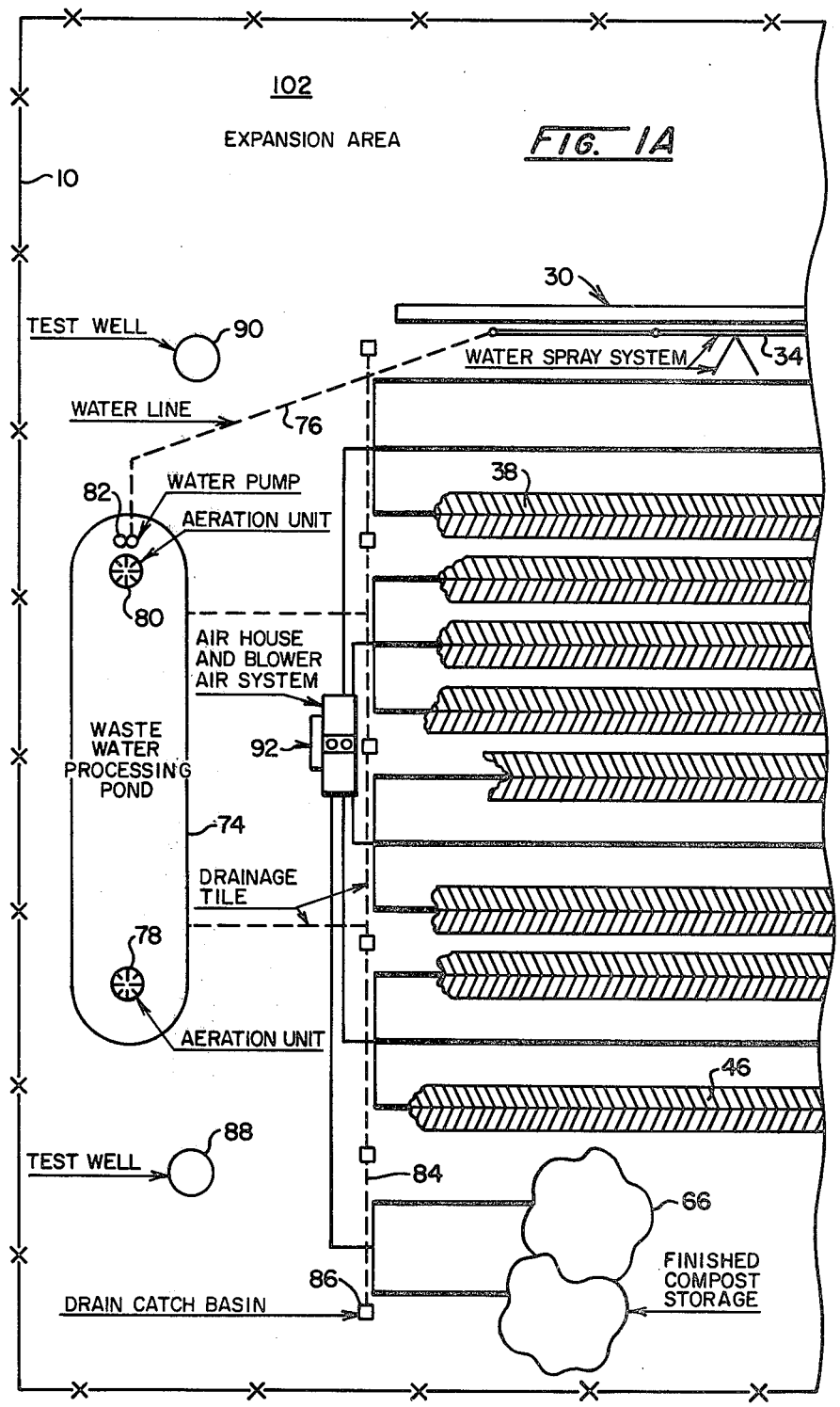

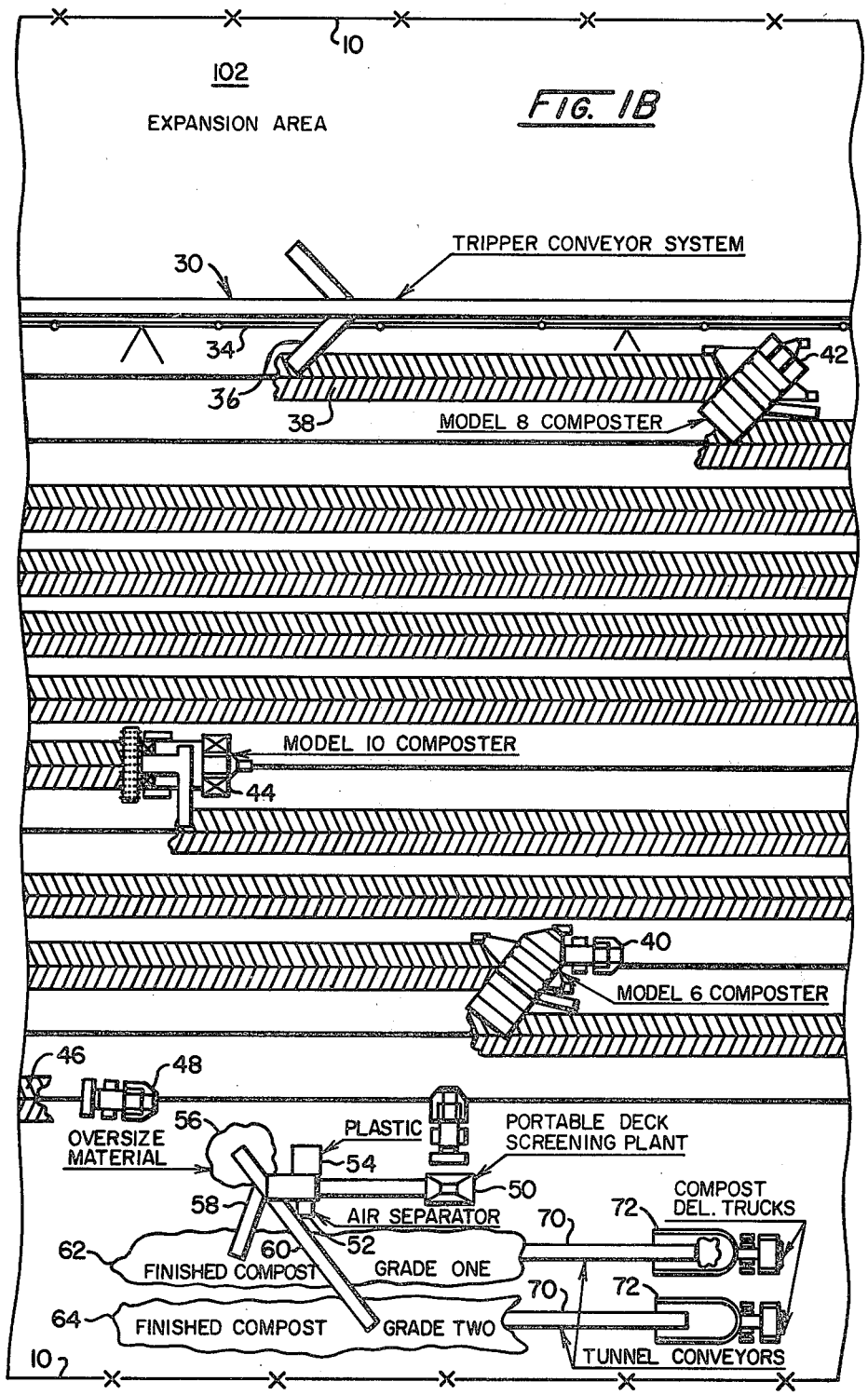

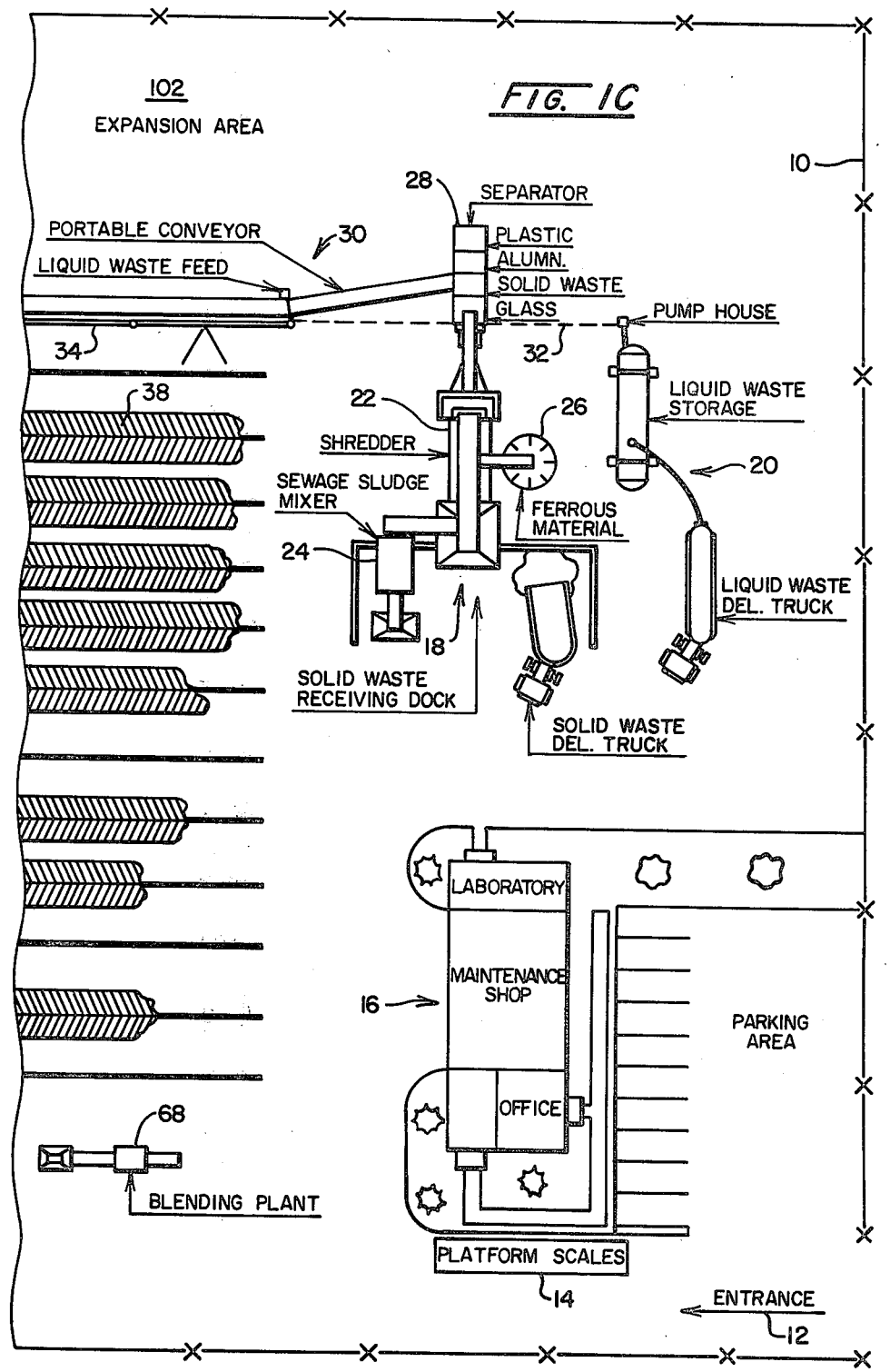

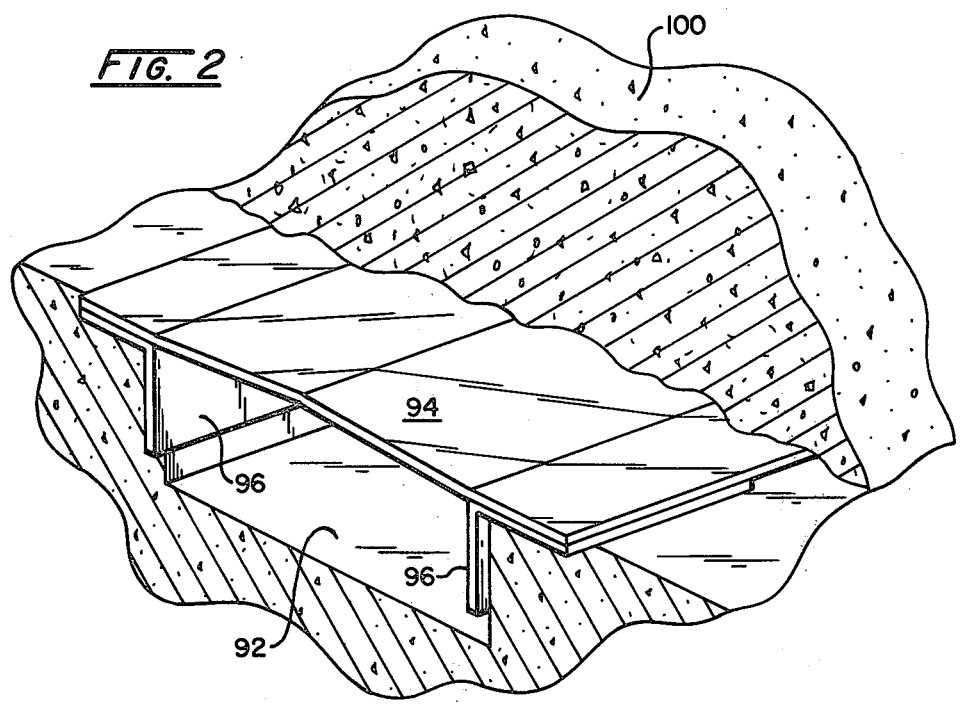

COMPOSTING SYSTEM USED IN SCRUBBING GAS EFFLUVIA

BACKGROUND OF THE INVENTION

The present invention relates to a much improved composting system and to the use of such system for scrubbing gas effluvia such as a high sulfur coal effluent.

Two problems pervading our modern society are the disposal of industrial and municipal wastes and the development of non-air polluting energy production. Relative to the latter problem, the return of industry to the utilization of coal as a principal energy source has considerably heightened efforts at developing non-air polluting techniques for its combustion. While coal reserves are plentiful, the quality thereof vis a vis non-polluting combustibility vary from region to region. Coal quality, from the standpoint of air quality standards, is predicated principally upon the sulfur and nitrogen content thereof. Three basic forms of sulfur are known to exist in coal: i.e. organic sulfur in which the sulfur is covalently bonded to carbon, pyritic sulfur, and sulfate. Governmental regulations prohibit the burning of high sulfur coal, i.e. coal containing greater than about 1.5% to 2% total sulfur, unless the proportion of $SO_2$ in the resulting effluent is reduced to below acceptance standards. Since it is estimated that approximately 33% of the total available coal in the continental United States exhibits a sulfur content acceptable for combustion without scrubbers, it is important to develop techniques which either improve the coal by lowering the sulfur content thereof prior to combustion or which economically and efficiently scrub the resulting sulfur dioxide in the combustion gas effluent. Further in this regard, 62% of the low sulfur coal reserves in the continental United States are found west of the Mississippi River. Unfortunately, almost 90% of the electric power generating capacity utilizing coal as a heat source is located east of the Mississippi River.

Relative to the first problem noted above, ever increasing growth of industry and population necessarily translates into an ever increasing source of industrial and municipal wastes which must be handled and disposed. The treatment of waste may be observed to vary from simple land-fill techniques to somewhat sophisticated chemical and biochemical conversion methods. With the latter methods, significant capital commitments generally are required and must be justified by virtue of environmental protection requirements and/or the generation of profitable byproducts. Controlled composting procedures are considered to offer significant promise for providing for an improved disposal of biodegradable industrial and municipal wastes while generating a somewhat valuable by-product. The preferred approach to treatment of wastes by biodegradation is one wherein composting is carried out in the thermophilic bacteria-phase at temperatures of about 40°–60° C. At such temperatures, bacteria, otherwise active in the mesophilic phase at lower temperatures, are avoided and noxious odors are not present during the biodegradation process. During the winter months, maintenance of such thermophilic phase temperature can be difficult and even in warmer weather there always is an initial time lag for the waste to reach an appropriate temperature so that the biodegradation process will proceed. Further, near the end of the composting process, the partially cured compost can generate excessive heat which may cause the temperature of the partially cured compost to exceed the maximum temperature which the thermophilic bacteria can tolerate.

Though the above-discussed problems appear to be unrelated, the prior art has attempted to connect them in a somewhat unique, though unsuccessful, fashion. This connection involves the use of soil and cured compost as scrubbers and filters for malodorent gases. In this regard see Bohn, "Soil and Compost Filters of Malodorent Gases", *Journal of the Air Pollution Control Association,* Vol. 25, No. 9, pp. 953–955 (September, 1975); Bohn, "Compost Scrubbers of Malodorous Air Streams", *Compost Science,* pp. 15–17 (Winter, 1976); Bohn, "Soil Absorption of Air Pollutants", *Journal of Environmental Quality,* Vol. 1, No. 4, pp. 372–377 (1972); and Bohn, "Soil Treatment of Organic Waste Gases", *Soil for Management of Organic Wastes and Wastewaters,* pp. 607–617 (1977). While soil and cured compost filters have proven successful in removing organic molodors from gaseous effluvia, all reported attempts at removing inorganic contaminants (such as, for example, $SO_2$, $H_2S$, $NO_x$, and the like) have proved unsuccessful. It has been reported that these gases readily are oxidized in the particulate filter to the corresponding acid which acid substantially diminishes the capacity and ability of the compost or soil filter to further absorb such contaminants. The usual solution proposed for this acid build-up problem is to charge lime into the compost for neutralizing the resulting acid. Unfortunately, the porosity and gas permeability of the limed material diminished to such an extent that the filters became useless.

The present invention solves the problems encountered in the prior art and renders an economic and efficient compost filtering operation.

BROAD STATEMENT OF THE INVENTION

The present invention is a method for removing an inorganic acid-forming moeity from a gas stream contaminated therewith, said moeity being or capable of forming an inorganic acid in the presence of molecular oxygen and water, and for producing a compost product from biodegradable organic waste. Such method comprises admitting at least intermittently a biodegradable organic waste into an active composting treatment site and maintaining such waste under thermophilic bacteria-phase digestion conditions. Such digestion conditions include adequate aeration and agitation, a water content by weight of between about 30% and 70%, and a temperature of between about 30° and 70° C. Such conditions are maintained for a time adequate for the waste to be substantially digested. While the digestion conditions are maintained, the contaminated gas stream is passed through the waste. The contact time between the waste and contaminated gas stream is adequate for substantially removing the vapor from the gas stream. A product gas stream substantially free of the vapor is vented from the waste and the compost product is at least intermittently removed from the site.

One advantage of the present invention is the production of a compost product useful as, for example, a surface treatment for strip mine soil reclamation or soil rejuvenation, and the production of a clean gas which is free of inorganic and organic contaminants. Another advantage is that the active compost filter can remove fly ash and other particulates quite effectively. The costs for both the composting and the scrubbing operations can be reduced dramatically additionally because of the mutual benefits which each system imparts to the other and to their combination. Also, since the composting material at least intermittently passes through the compost site, generally there is less waste gas to scrub per unit weight or volume of the composting material and, thus, acid build-up in the composting waste is minimized. Additionally, increased aeration can be achieved by contact of the gas stream with the composting material. Further, the heat value from the contaminated gas stream can be used advantageously through a unique piping or ductwork system desirably installed in the composting treatment site for excellent temperature control of the composting material as it proceeds through the site. This heat balancing can substantially reduce the incipient lag time normally encountered until the temperature of the waste reaches thermophilic-bacteria phase operability. A still further advantage is that a more potent thermophilic bacteria colony is available to operate upon the contaminants in the gas stream because active composting material is used in the present process. A still further advantage is that the volume of waste withdrawn from the composting treatment site is less than the volume of waste initially admitted onto the site so that handling and disposal of the final composted product can be achieved in a more economic and efficient fashion, especially per unit volume of contaminated gas scrubbed in the process. Yet further, the composting (or partially composted) waste is rather coarse in particle size so that filtration will be spread out through the entire waste rather than at the point of initial contact between the waste and the contaminated gas stream. This increased porosity of the composting waste means that plugging of the waste should be greatly diminished. Windrowing of the composting waste will aid in maintaining (or restoring) the desirable porosity of the waste also. These and other advantages will become readily apparent based on disclosure herein contained.

BRIEF DESCRIPTION OF THE DRAWINGS

FIG. 1, composed of FIGS. 1A, 1B and 1C, is a schematic overhead plan view of the composting site of the present invention; and FIG. 2 is a partial cut-away cross-sectional elevation view of one of the windrows and associated underground plenum.

These drawings will be described in detail in connection with the Detailed Description of the Invention which follows.

DETAILED DESCRIPTION OF THE INVENTION

FIG. 1 depicts a comprehensive active composting site bounded by fence 10. Referring to FIG. 1C, trucks conveying the solid, liquid, or gaseous biodegradable organic waste enter the compost site at entrance 12 and proceed to platform scales 14 for weighing the waste and for determination of the volume of the waste being transported. Platform scales 14 are adjacent buildings 16 which house the laboratory, maintenance shop, and offices of the composting site. The trucks, having been logged in as to the waste material which they are conveying, proceed to solid waste receiving dock 18 or liquid waste receiving area 20 as is appropriate. The solid organic waste typically includes municipal solid waste, industrial waste, and the like. Most incoming solid waste materials will be sent to shredder 22 where the waste is mixed and shredded to a size of less than about 20 cm and typically about 15-20 cm nominal particle size. Of course, some organic waste may skip the shredding operation and even some waste may be in suitable form for direct addition to the final compost product. Sewage sludge, typically rather gelatinous in form, is admitted to sewage sludge mixer 24 which then feeds the mixed sewage sludge to the solid organic waste for entry into shredder 22. Ferrous and like heavy metals desirably are withdrawn from the main bulk of the waste into area 26. The bulk of the shredded organic waste then preferably is passed through air separator 28 which separates the material into its various components including glass, solid waste, aluminum, plastic, and the like. Additional separation procedures (e.g. water, magnetic, etc.) may augment or replace the air separation system shown in the drawings. The solid waste then is transported via conveyor 30 for its entry into the composting system.

The liquid waste admitted to liquid waste storage area 20 preferably is pumped through line 32 for entry into water spray system 34 which will be described later herein. It will be appreciated that a variety of other wastes may enter the system as is necessary, desirable, or convenient.

Referring to FIG. 1B, portable conveyor 30 is a tripper conveyor system employing tripper arm 36 which distributes the organic waste from conveyor 30 onto the bed of the composting site for forming first compost windrow 38. The waste is admitted into the compost site at least intermittently. Since there is a volumetric decrease of material through the composting process, the waste feed will not necessarily enter the site at the same rate as the composted product is withdrawn from the site. It will be appreciated that this process may be termed "continuous" or "semi-continuous" with batching of the feed organic waste for entry into the compost site. Note, that the composting site can be expanded easily into area 102 which can be served by conveyor 30 also. The decomposable organic waste in first windrow 38 and the remaining rows depicted in the drawing are subjected to a controlled composting procedure for biodegradation of the waste. The biodegradation or composting is carried out under thermophilic bacteria-phase digestion conditions. These conditions include adequate aeration and agitation, a water content by weight of between about 30% and 70%, advantageously between about 40% and 60%, and a temperature of between about 30° and 70° C., advantageously between about 40° and 60° C. The rows are in the open and, thus, costly buildings are not needed though certainly the process will work quite efficiently with enclosed windrows. Such composting is effected by ambient conditions with control of the moisture and temperature being effected. The preferred method of composting for the present invention is known as "windrowing". In this process, the waste material is progressively transferred from one row position to the next across a treatment region for a time period sufficient until a last row position is reached at which point the digestive process is completed. Since a volumetric decrease of material is experienced through the site, preferably some row combining about the middle of the process and site typically can be practiced.

While conventional windrowing-type machines such as shown by Cobey in U.S. Pat. Nos. 3,369,797; 3,606,265; 3,664,645; and 3,733,033, may be utilized, three novel windrowing composting apparatuses are water accumulating in plenum 92 is desirably passed into drainage tile 84 for admission into pond 74. It should be appreciated that a variety of various types of plenum arrangements for contact of the contaminated gas stream with the composting material can be utilized, though for windrowing operation the arrangement shown in FIG. 2 presently is preferable. Reference is made to the Bohn citation, entitled "Soil and Compost Filters of Malodorent Gases", supra, for additional types of plenum arrangements.

The various plena underneath the rows of compost all are mutually interconnected and all are connected to air system 92. Air system 92 includes means for forcing gas or vapor through the composting rows or for providing suction of gases from the composting rows. Additionally, means are provided in air system 92 for cooling any gas stream passed therethrough into the plena as well as for humidifying or dehumidifying such gases passed thereinto. Further, means are provided in air system 92 for heating or cooling any gas stream either being passed to the plena or withdrawn therefrom. The inorganic acid-forming vapor gas containing gas stream is passed through air system 92 and forced into the plena underneath the composting rows so that effective contact therebetween can be achieved. Additionally, particulates in the gas stream will be effectively contacted and filtered by the composting waste. Note, that waste gas from coal combustion (e.g. from an electrical power plant) contains fly ash which will be filtered by the composting waste. The fly ash will increase the basicity of the waste for increased tolerance of acid by the waste (Johnson, *Power Engineering*, June, 1979). Further, vaporous organic waste may be passed into the plena for contacting with and removal by the composting waste. Organic wastes include, for example, malodorous compounds, organic acids, organic bases, organic salts, and the like. Typical inorganic acid-form contaminants which can be removed by the composting waste include, for example, $NO_x$, $SO_2$, HCl, HF, $HNO_3$, $H_2SO_4$, $H_3PO_6$, $H_2S$, and the like in vaporous, gaseous, or mist form. Note, that a base (e.g. lime or the like) may be mixed with the composting waste to ensure that excess acid build-up is avoided. No loss of permeability or porosity of the composting waste is experienced because windrowing of the waste serves to maintain or re-establish the requisite porosity of the waste. In most instances, though, a base addition is not recommended unless acid build-up becomes a serious problem.

Additionally, air system 92 and appurtenant piping and duct work is suitably designed so that, if desired, heat can be withdrawn from later composting rows and passed to initial composting rows in order to minimize the incipient lag time for composting in the initial rows and/or to maintain the proper heat required in the later rows for thermophilic bacteria-phase digestion. It will be appreciated that a variety of schemes are possible for interconnecting the various plena, ductwork, and piping involved in the composting site for achieving delicate and specialized control of the composting conditions necessary for effectively and efficiently accomplishing the composting process. Concomitantly, the scrubbing of the gas stream can be accomplished quite effectively and efficiently utilizing the air system and apurtenant piping and ductwork for effectively, efficiently, and very economically scrubbing the inorganic acid-forming vapor, particulates, and organic contaminants from a gas stream passed into contact with the composting waste.

As an illustrative design example of the present invention, it is assumed that the area of composting waste is 70 m$^2$ per m$^3$/sec. of gas flow therethrough (this figure is based on the Bohn article, "Compost Scrubbers of Malodorous Air Streams", supra, for the Duisburg scrubber which uses only fully composted waste, and is merely for illustration and not by way of limitation of the present invention). Another assumption is that a typical coal-burning electricity generating plant exhausts waste gases at the rate of about 182 m$^3$/sec. (this figure is from the Pickaway, Ohio, plant of Columbus and Southern Ohio Electric Company). Based on the foregoing assumptions, it would probably require an active composting site containing 26 rows each measuring about 3.05 meters wide by 1.5 meters high by 122 meters long (each row being a rounded pile approximately parabolic in outer configuration) to effectively scrub and filter the waste gases. This translates to a standard approximately 200 ton per day municipal waste composting site which would occupy a little over 12,140 m$^2$ (3+ acres).

It can be visualized further that the enormous heat content of a coal combustion off-gas may be in excess of the heat that the compositing material can tolerate and still maintain odorless thermophilic digestion. While mere dissipation of the heat is posible, it may be more economical overall to convert water to steam with such excess waste heat for driving turbines to generate electricity. In fact, there are a number of practical uses for such waste heat including, for example, grain drying, alcohol production, drying of sewage and sludge, drying compost for bagging, organic fertilizer production, and the like. Of course, other uses of this waste heat should be readily apparent to those skilled in the art. Finally, it should be apparent that other modes for composting the organic waste are conceivable and such other modes clearly are suitable for use in scrubbing contaminated gas streams according to the present invention. For example, large vertical silos may be used in the process by feeding waste from the top of the contaminated gas stream from the bottom to establish a countercurrent relationship therebetween. Suitable mixing means (e.g. augers or the like) disposed within the silos could adequately aerate and agitate the composting waste. Heat control probably would be easier by appropriate insulation of the silos. The moisture content of the waste also probably would be easier to control since the waste would be confined. The residence time in the silos would be adjusted to ensure the priper degree of composting desired. The contaminated gas stream and any air flow required could be passed through the silo by means of fans or the like either pulling or pushing the flow through the waste filled silo.

I claim:

1. A method for removing an inorganic acid-forming moeity from a gas stream contaminated therewith, said moeity being or capable of forming an inorganic acid in the presence of molecular oxygen and water, and for producing a compost product from substantially non-digest biodegradable organic waste comprising municipal waste and industrial waste, which comprises:

a. admitting at least intermittently biodegradable organic waste into an active composting treatment site;

b. maintaining said waste under thermophilic bacteria-phase digestion conditions including adequate depicted in the drawing. Windrowing apparatus 40 (Model 6 composter, Ultimate Resources, Inc., Westerville, Ohio) is a much improved apparatus a shown in applicant's commonly assigned copending application Ser. No. 114,634, filed Jan. 23, 1980 entitled "Windrowing Type Composting Apparatus", the disclosure of which is expressly incorporated herein by reference. The Model 6 composter utilizes a flight conveyor having a series of parallel, elongate paddles which are mutually interconnected by continuous chains and driven by a hydraulic motor. The apparatus conveys the compost from one row, typically having a width of about 10–12 feet, to a subsequent row position and slightly forward in relationship to the prior row in the direction of the composting apparatus. Adjacent rows become spaced about 12–15 feet apart from center-to-center, typically. A Model 7 composter is a mirror image of the Model 6 composter for conveying the material from the row shown being formed by composter 40 to the next adjacent row. A mirror-image composter is needed because each composter passes the composting waste to the next row in one direction only and always slightly ahead of the position the waste occupied in the previous row. The mirror-image composter, then, runs in the opposite direction from its counterpart model to reverse this forward directional movement of the composting waste.

Alternatively, composter 42 (Model 8 composter, Ultimate Resources, Inc.) is essentially the same as the Model 6 composter except that the Model 8 composter is entirely self-propelled, whereas the Model 6 composter relies on a front end loader or similar equipment for driving the paddle wheel and for imparting motion to the composter. For the Model 8 composter and its mirror-image Model 9, reference is made to applicant's commonly assigned copending application Ser. No. 255,752, filed Apr. 20, 1981, entitled "Self-Propelled Composter", the disclosure of which is expressly incorporated herein by reference.

Composter 44 employs a spiked barrel-type cylinder at its front for lifting and aerating the compost and depositing it upon a conveyor system which ultimately deposits the waste to form an adjacent row. This Model 10 composter can effectively operate on rows which are higher than the rows which can be operated upon by the Models 6–9 composters and its conveyor system is designed for discharge on either side thereof.

Depending upon the prevailing ambient conditions and other well known factors, each row of organic waste typically is windrowed about every 24 hours. Depending upon the volume of organic waste anticipated for admission to the composting site and the estimated composting time, the area of the composting site is chosen. The composting system, though, does have the flexibility for permitting the rows of organic waste to remain extra periods of time in case composting becomes unduly dilatory or to laterally transfer the rows of waste at shorter intervals of time in case composting is proceeding faster than expected. In any event, last windrow 46 contains the substantially composted waste. The organic waste product in row 46 is conveyed by front-end loader 48 to portable deck screening plant 50. In plant 50 the composted waste can additionally be subjected to separation with air separator 52 to remove any plastic to area 54 or oversized material to area 56 which is contained in the composted waste. It will be appreciated that additional foreign materials may be separated at this stage of the process also. The finished compost then can be screened into one, two, or more grades depending upon the size distribution of compost desired. As shown in the drawing, the compost desirably is screened into two grades and conveyed via conveyors 58 and 60 to finished compost piles 62 and 64, respectively. The finished, graded compost then is stored in finished compost storage area 66. Blending plant 68 can be used to blend one or more sizes of the finished compost and/or additional desirable material depending upon the precise content of specialty composts desired. The finished compost then can be conveyed via tunnel conveyors 70 onto compost delivery trucks 72 for ultimate disposal or use of the product. It will be apparent that other classification systems may be used in the process, even air separator 28 (FIG. 1C) at the beginning of the system. Further, uncomposted or incompletely composted material may be recycled to the beginning of the process.

Referring to FIG. 1A, the proper moisture digestion conditions are maintained via water spray system 34 which can utilize the liquid waste fed thereto via line 32 and/or wastewater stored in pond 74 which is transported to water spray system 34 via water line 76. Pond 74 desirably has aeration units 78 and 80 for insuring thermophilic bacteria-phase conditions in pond 74 for suppressing odors therefrom. Water pump 82 is used to pump the water from pond 74 through water line 76 into water spray system 34. The water spray system nozzles can be desirably placed at points around the composting site so that coverage of all rows can be effected. Water drainage from finished compost storage area 66 can be transported via drainage tile 84 for passage into pond 74. Additionally, water in drain tile 84 can be accumulated in drain catch basins 86. Test wells 88 and 90 are used to insure that no contamination of ground water results from the composting process. Note, that thermophilic bacteria colonies may be added to the water system as an innoculant for the waste. In fact, the waste especially the first row or two, by a wide variety of techniques as those skilled in the art will appreciate.

Air house and blower air system 92 (FIG. 1A) is an integral part of the composting site and provides heat balance to the composting waste as well as effecting contact between inorganic acid-forming vapor in a gas stream and the composting or partially composted waste. Underneath each of the rows of composting waste, as shown in FIG. 2, is plenum 92 which preferably is merely a rectangular or similar configuration trench (nominally 5.7 cm deep and 16 cm wide) dug into the ground beneath each row. Preferably, the adjacent composting areas can be suitably hardsurfaced e.g. by blacktopping or the like. Plate 94 of suitable metal for resistance to corrosion and rough handling fits into the plenum 92. Plate 94 is supported by angle irons 96 which are placed intermittently under plate 94 and into the plenum 92 so that at the places where such angle irons are missing, there is formed passageways between the ground and plate 94 from which gas or vapor in plenum 92 can pass up through compost 100. Plate 94 preferably comprises a series or segments of plates fitted together. Such construction enables quick removal of the plates at points at which blockages of the passageway from plenum 92 to composting waste 100 occurs. It will be appreciated that by suitable arrangement of the length of angle irons 96 and the spaces therebetween, that partial control of the volume and flow rate of any gases passing through plenum 92 can be effected. Any aeration and agitation, a water content by weight of between about 30% and 70%, and a temperature of between about 30° and 70° C., for a time adequate for said waste to be substantially digested;

c. passing said contaminated gas stream through said digesting waste while maintaining said digestion conditions, the contact time therebetween being adequate for substantially removing said moeity from said gas stream;

d. venting a product gas stream substantially free of said moeity from said waste; and e. removing at least intermittently said compost product from said site.

2. The method of claim 1 wherein said gas stream is generated from the combustion of sulfur-containing coal.

3. The method of claim 1 wherein said organic waste comprises municipal waste.

4. The method of claim 1 wherein said waste is formed into substantially parallel rows.

5. The method of claim 4 wherein said rows of waste are periodically windrowed for agitation and aeration of said waste.

6. The method of claim 4 wherein a plenum is provided under each row for conveying said contaminated gas stream to said rows for passing said stream therethrough.

7. The method of claim 6 wherein means are provided for cooling said gas stream prior to its passing through said digesting waste.

8. The method of claim 6 wherein means are provided for aerating, humidifying, or dehumidifying said gas stream prior to its passing through said digesting waste.

9. The method of claim 1 wherein the water content of said digesting waste is maintained by spraying water on said waste.

10. The method of claim 1 wherein said gas stream also contains particulates which are filtered from said stream by said digesting waste.

11. The method of claim 1 or 10 wherein said gas stream further contains organic contaminants which are removed by said digesting waste and oxidized by said thermophilic bacteria in said waste.

* * * * *